US012604044B2

(12) United States Patent
Sze

(10) Patent No.: US 12,604,044 B2
(45) Date of Patent: *Apr. 14, 2026

(54) VIDEO CONTENT DISTRIBUTION METHODS

(71) Applicant: Texas Instruments Incorporated, Dallas, TX (US)

(72) Inventor: Vivienne Sze, Cambridge, MA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/351,484

(22) Filed: Oct. 7, 2025

(65) Prior Publication Data

US 2026/0039884 A1 Feb. 5, 2026

Related U.S. Application Data

(63) Continuation of application No. 19/261,361, filed on Jul. 7, 2025, which is a continuation of application (Continued)

(51) Int. Cl.
*H04N 19/91* (2014.01)
*H04N 19/122* (2014.01)

(Continued)

(52) U.S. Cl.
CPC ........... *H04N 19/91* (2014.11); *H04N 19/122* (2014.11); *H04N 19/46* (2014.11); *H04N 19/50* (2014.11);

(Continued)

(58) Field of Classification Search
CPC ...... H04N 19/91; H04N 19/122; H04N 19/46; H04N 19/50; H04N 19/61; H04N 19/70;

(Continued)

(56) References Cited

U.S. PATENT DOCUMENTS

2006/0294174 A1* 12/2006 Haque ................... H04N 19/42
                                                                      375/E7.199
2007/0103347 A1* 5/2007 Park ..................... H04N 19/436
                                                                      341/50

(Continued)

FOREIGN PATENT DOCUMENTS

EP        3745724 A1 * 12/2020  ............. H04N 19/12
WO    WO-2011128268 A1 * 10/2011  ........... H04N 19/436

OTHER PUBLICATIONS

"Advanced Video Coding for Generic Audiovisual Services", Series H: Audiovisual and Multimedia Systems, ITU-T Recommendation H.264, Telecommunication Standardization Sector of International Communication Union, pp. 1-343, Mar. 2005.

(Continued)

*Primary Examiner* — Maria E Vazquez Colon
(74) *Attorney, Agent, or Firm* — Carl G. Peterson; Frank D. Cimino

(57) ABSTRACT

A method for entropy encoding syntax elements of transform coefficient levels in a video encoder to generate a compressed video bit stream is provided that includes selecting a context for a first significant coefficient flag corresponding to a first transform coefficient level in a 32×32 transform block, wherein the first transform coefficient level is at a lowest frequency position in the 32×32 transform block, entropy encoding the first significant coefficient flag using the context, selecting the context for a second significant coefficient flag corresponding to a second transform coefficient level in a 16×16 transform block, wherein the second transform coefficient level is at a lowest frequency position in the 16×16 transform block, and entropy encoding the second significant coefficient flag using the context.

20 Claims, 9 Drawing Sheets

Related U.S. Application Data

No. 18/106,174, filed on Feb. 6, 2023, now Pat. No. 12,375,735, which is a continuation of application No. 15/427,961, filed on Feb. 8, 2017, now Pat. No. 11,575,946, which is a continuation of application No. 13/539,580, filed on Jul. 2, 2012, now abandoned.

(60) Provisional application No. 61/503,478, filed on Jun. 30, 2011.

(51) Int. Cl.

| | |
|---|---|
| *H04N 19/46* | (2014.01) |
| *H04N 19/50* | (2014.01) |
| *H04N 19/61* | (2014.01) |
| *H04N 19/70* | (2014.01) |
| *H04N 19/176* | (2014.01) |
| *H04N 19/184* | (2014.01) |
| *H04N 19/186* | (2014.01) |

(52) U.S. Cl.
CPC ............. *H04N 19/61* (2014.11); *H04N 19/70* (2014.11); *H04N 19/176* (2014.11); *H04N 19/184* (2014.11); *H04N 19/186* (2014.11)

(58) Field of Classification Search
CPC ... H04N 19/176; H04N 19/184; H04N 19/186
See application file for complete search history.

(56) References Cited

U.S. PATENT DOCUMENTS

| | | |
|---|---|---|
| 2009/0196355 A1 | 8/2009 | Kao |
| 2012/0082232 A1 | 4/2012 | Sole Rojals |
| 2012/0177300 A1 | 7/2012 | Sasai |
| 2012/0230417 A1 | 9/2012 | Sole Rojals |
| 2013/0058407 A1* | 3/2013 | Sole Rojals ......... H04N 19/184 |
| | | 375/240.18 |
| 2013/0259118 A1 | 10/2013 | Fu |

OTHER PUBLICATIONS

Benjamin Bross et al, "High Efficiency Video Coding (HEVC) Text Specification Draft 6", JCTVC-H1003, Joint Collaborative Team on Video Coding (JCT-VC) of ITU-T SG16 WP3 and ISO/IEC JTC1/SC29/WG11, pp. 1-259, Nov. 21-30, 2011, Geneva, Switzerland.
Benjamin Bross et al, "High Efficiency Video Coding (HEVC) Text Specification Draft 7" JCTVC-I1003_d1, Joint Collaborative Team on Video Coding (JCT-VC) of ITU-T SG16 WP3 and ISO/IEC JTC1/SC29/WG11, pp. 1-272, Apr. 27-May 7, 2012, Geneva, Switzerland.
Benjamin Bross et al, "WD4: Working Draft 4 of High-Efficiency Video Coding", JCTVC-F803_d6, Joint Collaborative Team on Video Coding (JCT-VC) of ITU-T SG16 WP3 and ISO/IEC JTC1/SC29/WG11, pp. 1-229, Jul. 14-22, 2011, Torino, Italy.
Benjamin Bross et al, "WD5: Working Draft 5 of High-Efficiency Video Coding", JCTVC-G1103_d9, Joint Collaborative Team on Video Coding (JCT-VC) of ITU-T SG16 WP3 and ISO/IEC JTC1/SC29/WG11, pp. 1-224, Nov. 21-30, 2011, Geneva, Switzerland.
Detlev Marpe et al, "Context-Based Adaptive Binary Arithmetic Coding in the H.264/AVC Video Compression Standard", IEEE Transactions on Circuits and Systems for Video Technology, pp. 620-636, vol. 13, No. 7, Jul. 2003.
Hisao Sasai and Takahiro Nishi, CE11: Context Size Reduction for the Significance Map (JCTVC-D185), JCTVC-E227 Presentation, Joint Collaborative Team on Video Coding (JCT-VC) of ITU-T SG16 WP3 and ISO/IEC JTC1/SC29/WG11, pp. 1-6, Mar. 16-23, 2011, Geneva, Switzerland.
Hisao Sasai and Takahiro Nishi, CE11: Context Size Reduction for the Significance Map (JCTVC-D185), JCTVC-E227, Joint Collaborative Team on Video Coding (JCT-VC) of ITU-T SG16 WP3 and ISO/IEC JTC1/SC29/WG11, pp. 1-6, Mar. 16-23, 2011, Geneva, Switzerland.
Hisao Sasai and Takahiro Nishi, "Simplified Context Modeling for Transform Coefficient Coding", JCTVC-D185 Presentation, Joint Collaborative Team on Video Coding (JCT-VC) of ITU-T SG16 WP3 and ISO/IEC JTC1/SC29/WG11, pp. 1-7, Jan. 20-28, 2011, Daegu, Korea.
Hisao Sasai and Takahiro Nishi, "Simplified Context Modeling for Transform Coefficient Coding", JCTVC-D185, Joint Collaborative Team on Video Coding (JCT-VC) of ITU-T SG16 WP3 and ISO/IEC JTC1/SC29/WG11, pp. 1-5, Jan. 20-28, 2011, Daegu, Korea.
Thomas Wiegand et al., "WD3: Working Draft 3 of High-Efficiency Video Coding", JCTVC-E603, Joint Collaborative Team on Video Coding (JCT-VC) of ITU-T SG16 WP3 and ISO/IEC JTC1/SC29/WG11, pp. 1-215, Mar. 16-23, 2011, Geneva, Switzerland.
Vivienne Sze, "CE11: Reduction in Contexts Used for Coefficient Level", JCTVC-G121, Joint Collaborative Team on Video Coding (JCT-VC) of ITU-T SG16 WP3 and ISO/IEC JTC1/SC29/WG11, pp. 1-4, Nov. 21-30, 2011, Geneva, Switzerland.
Vivienne Sze, "Reduction in Contexts Used for significant_coeff_flag and Coefficient Level", JCTVC-F132 Presentation, Joint Collaborative Team on Video Coding (JCT-VC) of ITU-T SG16 WP3 and ISO/IEC JTC1/SC29/WG11, pp. 1-6, Jul. 13-22, 2011, Torino, Italy.
Vivienne Sze, "Reduction in Contexts Used for significant_coeff_flag and Coefficient Level", JCTVC-F132, Joint Collaborative Team on Video Coding (JCT-VC) of ITU-T SG16 WP3 and ISO/IEC JTC1/SC29/WG11, pp. 1-4, Jul. 14-22, 2011, Torino, Italy.

* cited by examiner

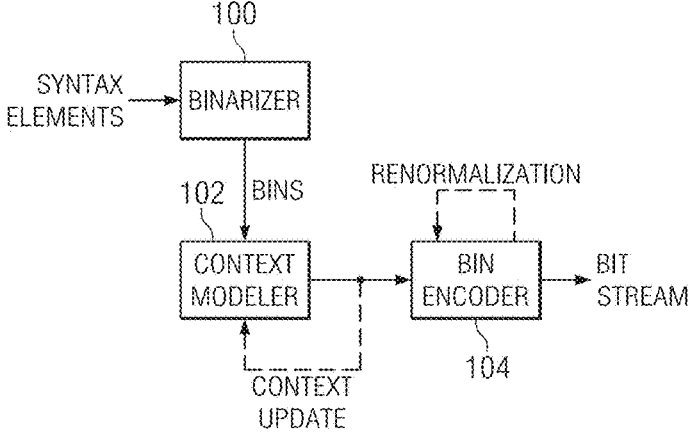
*FIG. 1A*
*(PRIOR ART)*
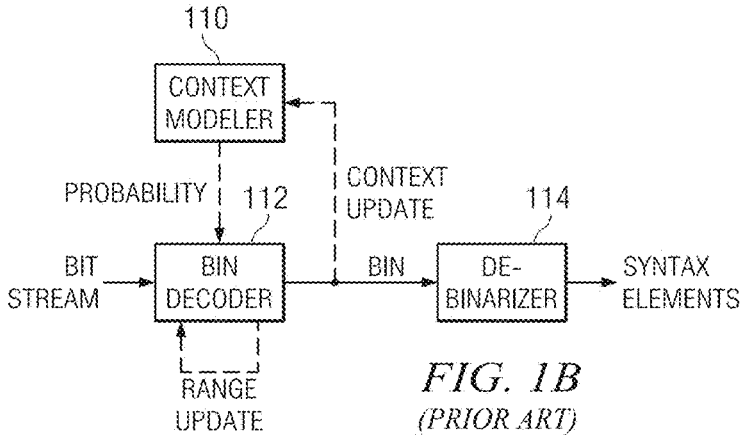
*FIG. 1B*
*(PRIOR ART)*
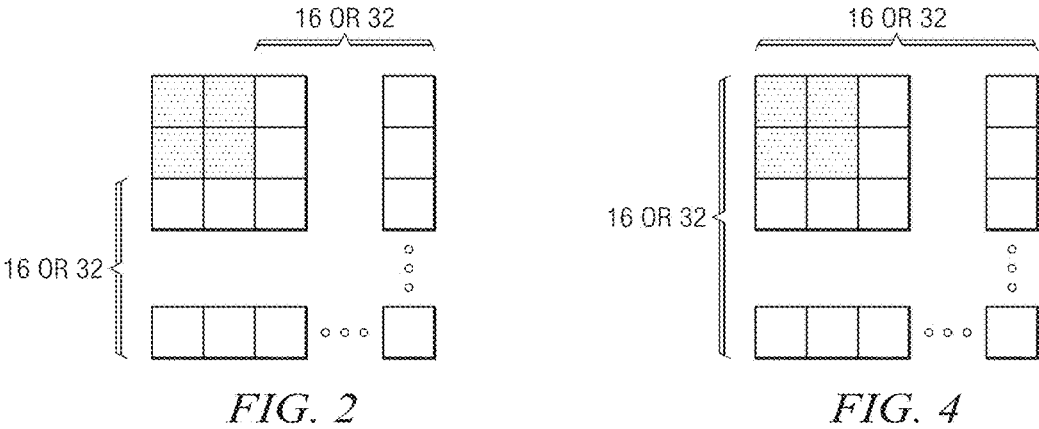
*FIG. 2*                    *FIG. 4*

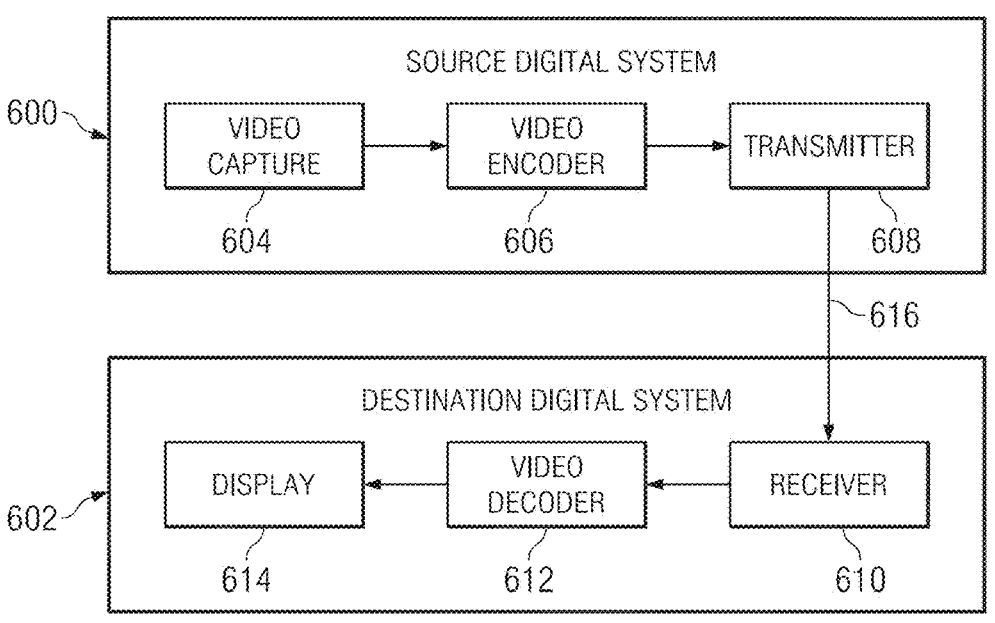

600

SOURCE DIGITAL SYSTEM

VIDEO CAPTURE
604

VIDEO ENCODER
606

TRANSMITTER
608

616

602

DESTINATION DIGITAL SYSTEM

DISPLAY
614

VIDEO DECODER
612

RECEIVER
610

*FIG. 6*

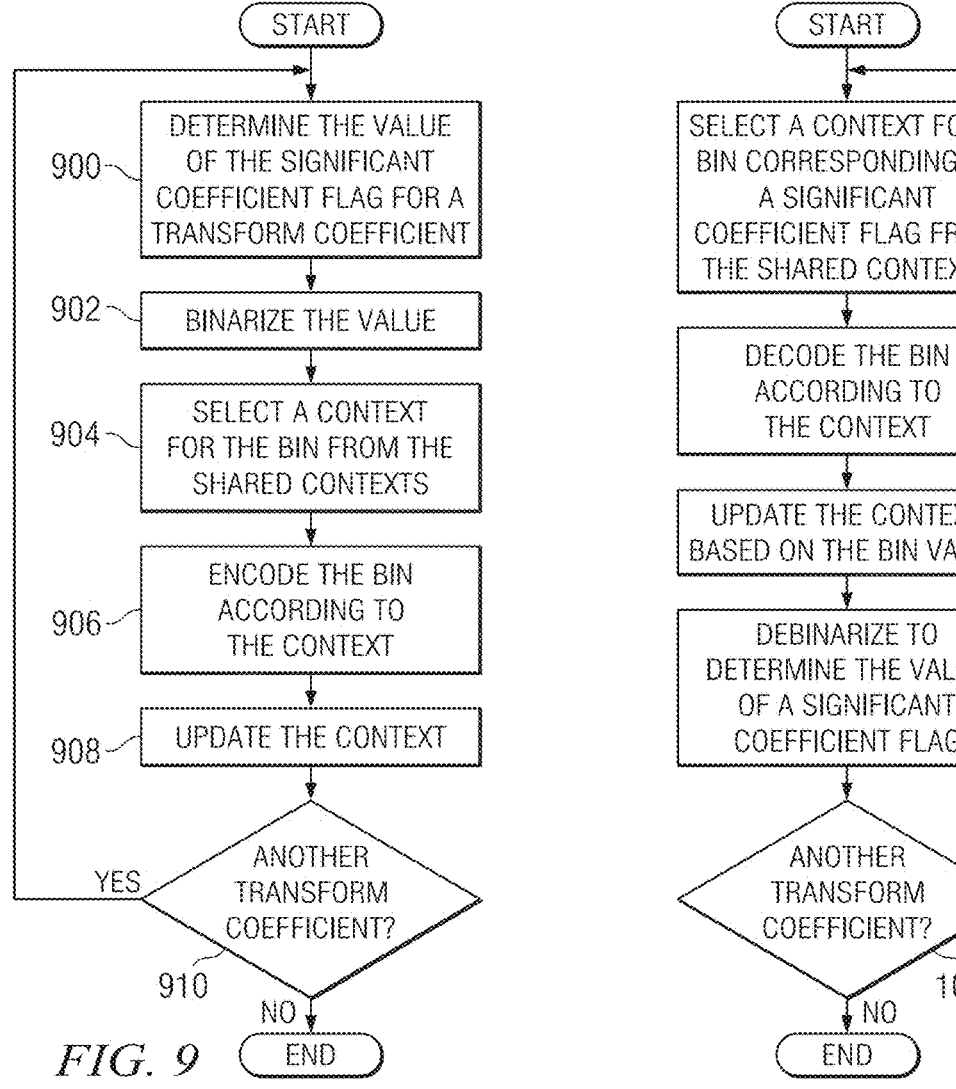

START

900 — DETERMINE THE VALUE OF THE SIGNIFICANT COEFFICIENT FLAG FOR A TRANSFORM COEFFICIENT

902 — BINARIZE THE VALUE

904 — SELECT A CONTEXT FOR THE BIN FROM THE SHARED CONTEXTS

906 — ENCODE THE BIN ACCORDING TO THE CONTEXT

908 — UPDATE THE CONTEXT

ANOTHER TRANSFORM COEFFICIENT?
910

YES

NO

END

*FIG. 9*

START

SELECT A CONTEXT FOR A BIN CORRESPONDING TO A SIGNIFICANT COEFFICIENT FLAG FROM THE SHARED CONTEXTS — 1000

DECODE THE BIN ACCORDING TO THE CONTEXT — 1002

UPDATE THE CONTEXT BASED ON THE BIN VALUE — 1004

DEBINARIZE TO DETERMINE THE VALUE OF A SIGNIFICANT COEFFICIENT FLAG — 1006

ANOTHER TRANSFORM COEFFICIENT?
1008

YES

NO

END

*FIG. 10*

VIDEO CONTENT DISTRIBUTION METHODS

CROSS-REFERENCE TO RELATED APPLICATIONS

This application is a continuation of U.S. application Ser. No. 19/261,361, filed Jul. 7, 2025, which is a continuation of U.S. application Ser. No. 18/106,174, filed Feb. 6, 2023 (now U.S. Pat. No. 12,375,735), which is a continuation of U.S. application Ser. No. 15/427,961, filed Feb. 8, 2017 (now U.S. Pat. No. 11,575,946), which is a continuation of U.S. application Ser. No. 13/539,580, filed Jul. 2, 2012, which claims benefit of U.S. Provisional Application No. 61/503,478, filed Jun. 30, 2011, which is incorporated herein by reference in its entirety.

BACKGROUND

Field of the Invention

Embodiments of the present invention generally relate to simplified context selection for entropy coding of transform coefficient syntax elements in video coding.

Description of the Related Art

Video compression, i.e., video coding, is an essential enabler for digital video products as it enables the storage and transmission of digital video. In general, video compression techniques apply prediction, transformation, quantization, and entropy coding to sequential blocks of pixels in a video sequence to compress, i.e., encode, the video sequence. Video decompression techniques generally perform the inverse of these operations in reverse order to decompress, i.e., decode, a compressed video sequence.

Context-adaptive binary arithmetic coding (CABAC) is a form of entropy coding used in video encoding. CABAC is an inherently lossless compression technique notable for providing considerably better compression than most other encoding algorithms used in video encoding at the cost of increased complexity. In brief, CABAC has multiple probability modes for different contexts. It first converts all non-binary symbols to binary symbols referred to as bins. Then, for each bin, the coder performs context modeling to select which probability model to use, and uses information from nearby elements to optimize the probability estimate. Arithmetic coding is then applied to compress the data. The theory and operation of CABAC coding for H.264/AVC is defined in the International Telecommunication Union, Telecommunication Standardization Sector (ITU-T) standard "Advanced video coding for generic audiovisual services" H.264, revision March 2005 or later, which is incorporated by reference herein. General principles are explained in "Context-Based Adaptive Binary Arithmetic Coding in the H.264/AVC Video Compression Standard," Detlev Marpe, July 2003, which is incorporated by reference herein.

CABAC is a well known throughput bottleneck in video codec implementations, particularly in decoding. Accordingly, improvements in CABAC processing performance are desirable.

SUMMARY

Embodiments of the present invention relate to methods and apparatus for simplified context selection for entropy coding of transform coefficient syntax elements. In one aspect, a method for entropy encoding syntax elements of transform coefficient levels in a video encoder to generate a compressed video bit stream is provided that includes selecting a context for a first significant coefficient flag corresponding to a first transform coefficient level in a 32×32 transform block, wherein the first transform coefficient level is at a lowest frequency position in the 32×32 transform block, entropy encoding the first significant coefficient flag using the context, selecting the context for a second significant coefficient flag corresponding to a second transform coefficient level in a 16×16 transform block, wherein the second transform coefficient level is at a lowest frequency position in the 16×16 transform block, and entropy encoding the second significant coefficient flag using the context.

In one aspect, a method for entropy decoding a compressed video bit stream in a video decoder is provided that includes selecting, from a first plurality of contexts, a first context for entropy decoding a first bin of a first significant coefficient flag of a luma transform block encoded in the compressed video bit stream, wherein the significant coefficient flag is for a 16×16 luma transform block or a 32×32 luma transform block, and wherein the first plurality of contexts are shared for entropy decoding of all significant coefficient flags of 16×16 luma transform blocks and 32×32 luma transform blocks, entropy decoding the bin using the first context; and updating the first context.

In one aspect, a digital system configured to decode a compressed video bit stream is provided that includes a memory configured to store a first context for entropy decoding of significant coefficient flags, wherein the first context is for entropy decoding of significant coefficient flags corresponding to a luma transform coefficient level at a lowest frequency position of a 32×32 luma transform block or a 16×16 luma transform block, means for selecting the first context for entropy decoding of a first bin of a first significant coefficient flag corresponding to a first luma transform coefficient level in a 32×32 luma transform block, means for entropy decoding the first bin using the first context, means for selecting the first context for entropy decoding of a second bin of a second significant coefficient flag corresponding to a second luma transform coefficient level in a 16×16 luma transform block, and means for entropy decoding the second bin using the first context.

BRIEF DESCRIPTION OF THE DRAWINGS

Particular embodiments will now be described, by way of example only, and with reference to the accompanying drawings:

FIGS. 1A and 1B are block diagrams illustrating CABAC encoding and decoding;

FIG. 2 is an example of context sharing;

FIG. 4 is an example of context sharing;

FIG. 6 is a block diagram of a digital system;

FIGS. 9-12 are flow diagrams of methods for simplified context selection in CABAC.

DETAILED DESCRIPTION

Figure 3:
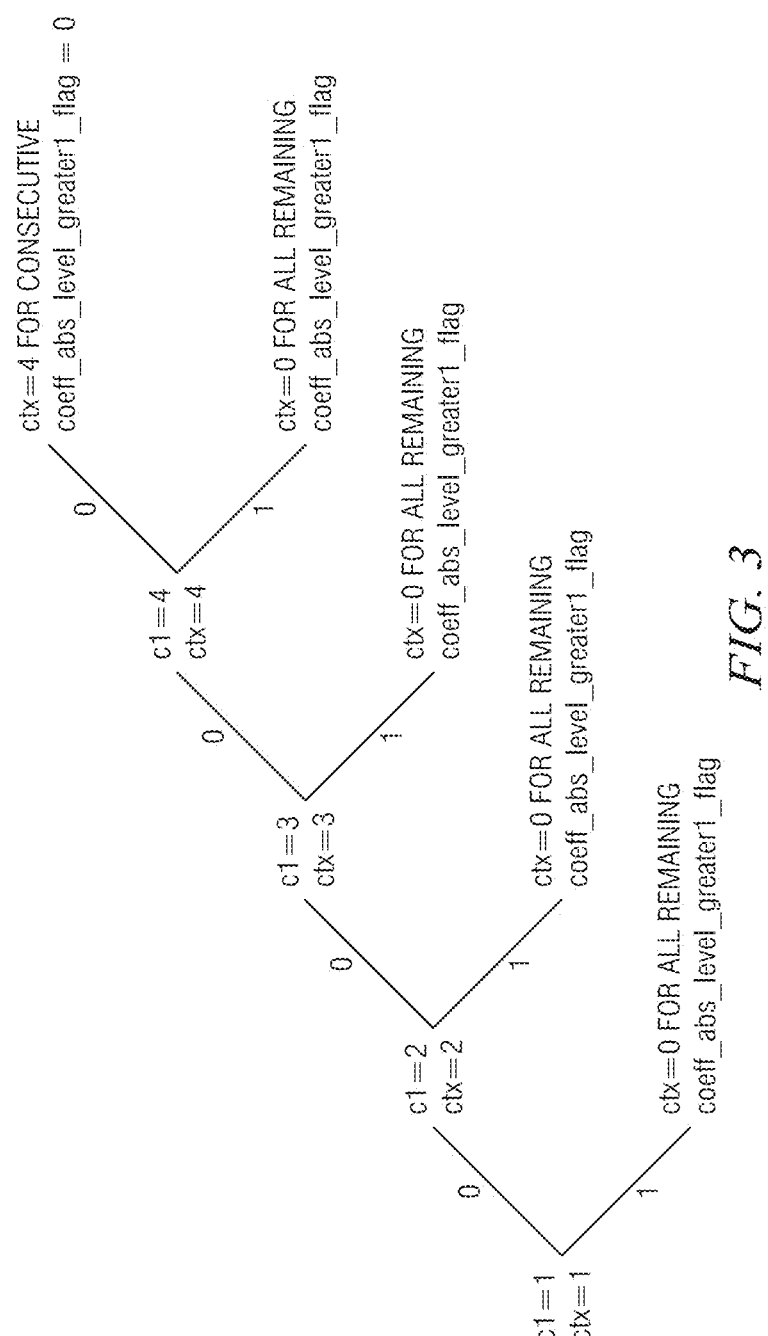
FIG. 3 illustrates a method for context selection.

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). HEVC is expected to provide around 50% improvement in coding efficiency over the current standard, H.264/AVC, as well as larger resolutions and higher frame rates. For convenience of description, some embodiments are described herein in reference to HEVC and use terminology from HEVC. One of ordinary skill in the art will understand that embodiments are not limited to HEVC.

Various versions of HEVC are described in the following documents, which are incorporated by reference herein: T. Wiegand, et al., "WD3: Working Draft 3 of High-Efficiency Video Coding," JCTVC-E603, Joint Collaborative Team on Video Coding (JCT-VC) of ITU-T SG16 WP3 and ISO/IEC JTC1/SC29/WG11, Geneva, CH, Mar. 16-23, 2011 ("WD3"), B. Bross, et al., "WD4: Working Draft 4 of High-Efficiency Video Coding, JCTVC-F803_d6, Joint Collaborative Team on Video Coding (JCT-VC) of ITU-T SG16 WP3 and ISO/IEC JTC1/SC29/WG11, Torino, IT, Jul. 14-22, 2011 ("WD4"), B. Bross. et al., "WD5: Working Draft 5 of High-Efficiency Video Coding, JCTVC-G1103_d9, Joint Collaborative Team on Video Coding (JCT-VC) of ITU-T SG16 WP3 and ISO/IEC JTC1/SC29/WG11, Geneva, CH, Nov. 21-30, 2011 ("WD5"), B. Bross, et al., "High Efficiency Video Coding (HEVC) Text Specification Draft 6, JCTVC-H1003, Joint Collaborative Team on Video Coding (JCT-VC) of ITU-T SG16 WP3 and ISO/IEC JTC1/SC29/WG1, Geneva, CH, Nov. 21-30, 2011 ("HEVC Draft 6"), and B. Bross, et al., "High Efficiency Video Coding (HEVC) Text Specification Draft 7, JCTVC-11003_d0, Joint Collaborative Team on Video Coding (JCT-VC) of ITU-T SG16 WP3 and ISO/IEC JTC1/SC29/WG1, Geneva, CH, Apr. 17-May 7, 2012 ("HEVC Draft 7"). Each of these documents describes CABAC coding.

Some aspects of this disclosure have been presented to the JCT-VC in V. Sze, "Reduction in Contexts Used for significant_coeff_flag and Coefficient Level", JCTVC-F132, Joint Collaborative Team on Video Coding (JCT-VC) of ITU-T SG16 WP3 and ISO/IEC JTC1/SC29/WG11, Torino, IT, Jul. 14-22, 2011, and V. Sze, "CE11Reduction in Contexts Used for Coefficient Level", JCTVC-G121, Joint Collaborative Team on Video Coding (JCT-VC) of ITU-T SG16 WP3 and ISO/IEC JTC1/SC29/WG11, Geneva, CH, Nov. 21-30, 2011, which are incorporated by reference herein in their entirety.

In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit.

A transform tree specifies the position and size of transform units (TU) for a coding unit. A transform unit may not be larger than a coding unit and the size of a transform unit may be, for example, 4×4, 8×8, 16×16, 32×32, 4×16, 16×4, 8×32, and 32×8. The sizes of the transform units and prediction units for a CU are determined by the video encoder during prediction based on minimization of rate/distortion costs.

As was previously mentioned, context-adaptive binary arithmetic coding (CABAC) is a well known throughput bottleneck in the implementation of video codecs. FIGS. 1A and 1B are block diagrams illustrating the three key components of, respectively, CABAC encoding and CABAC decoding. As shown in FIG. 1A, a CABAC encoder includes a binarizer 100, a context modeler 102, and a bin encoder 104. The binarizer 100 converts syntax elements into strings of one or more binary symbols referred to as bins. In general, a syntax element is an element of data produced by the video encoding process. For example, a syntax element may be a motion vector difference, a prediction mode, a coefficient level, a flag, a reference index, etc. The syntax elements are defined by the particular coding standard in use, e.g., HEVC.

The binarization of a syntax element is also defined by the video coding standard in use, i.e., the standard dictates the content of the binary symbol string for each syntax element. For example, HEVC defines a binarization scheme with unique mappings of syntax elements to sequences of bins. Examples of binarization include unary coding, truncated unary coding, exp-Golomb coding, and fixed length coding.

The context modeler 102 selects a context model for a context-coded bin. The video coding standard, e.g., HEVC, defines the available context models, the initial values of the context models, and which context model(s) should be used for bins of each syntax element. A context model includes a state value and a binary value of the most probable symbol MPS. The context models are updated throughout the coding process to track the probability estimations. That is, a bin is encoded based on the current state of the context model selected by the context modeler 102, and the context model is then updated to reflect the state transition and the MPS after the bin is coded.

The bin encoder 104 performs binary arithmetic coding of a bin using the context model (probability) selected by the context modeler 102. Binary arithmetic coding is based on the principle of recursive interval subdivision of an interval of width R. The current interval for each recursion, i.e., the internal state of the arithmetic coding, is represented by its lower bound L and its width (range) R. For each bin to be encoded, the current interval is subdivided into two subintervals, an interval of width $R_{LPS}=R^*p_{LPS}$ and an interval of width $R_{MPS}=R-R_{LPS}$, where $p_{LPS}$ is an estimate of the probability of the least probable symbol (LPS), and MPS is the most probable symbol, with a probability of $1-p_{LPS}$. The value of $p_{LPS}$ is determined using the state value of the context model. Depending on whether the bin is the LPS or MPS, the corresponding subinterval is selected as the interval for the next bin.

The lower bound L and the range R are updated according to the lower bound and range of the selected subinterval. A renormalization process is then executed to rescale the lower bound L and the range R if needed. The renormalization process iteratively scales the range R to a minimum value of 256 with successive left shifts by 1 and may take from zero to 8 iterations depending on the value of the range R. In each iteration, the lower bound L is also scaled and a single output bit is generated to be added to the encoded bit stream. The polarity of the output bit is determined by the value of the lower bound L at each iteration. However, in certain cases, the polarity of an output bit may need to be resolved in subsequent iterations or in renormalization after coding one or more subsequent bins, i.e., carry propagation may occur. Such bits are referred to as outstanding bits. A count is kept of these outstanding bits and they are output when a future output bit resolves them to a known value. Thus, 0 to 8 output bits may be generated during renormalization plus any outstanding bits may also be output.

The CABAC decoding process is the inverse of the encoding process. Referring now to FIG. 1B, a CABAC decoder includes a bin decoder 112, a context modeler 110, and a de-binarizer 114. The context modeler 110 selects a context model for the next context-coded bin to be decoded. As in the encoder, the context models are updated throughout the decoding process to track the probability estimations. That is, a bin is decoded based on the current state of the context model selected by the context modeler 110, and the context model is then updated to reflect the state transition and the MPS after the bin is decoded.

The bin decoder 112 performs binary arithmetic decoding of a bin using the context model selected by the context modeler 110. Binary arithmetic decoding, like binary arithmetic encoding, is based on the principle of recursive interval subdivision of an interval of width (range) R. The internal state of the arithmetic decoding for each recursion is represented by the range R and an offset 0 used to select the correct subinterval for a bin. A decoded bin is output at each recursion.

To decode a bin, the current interval is subdivided into two subintervals, an interval of width $R_{LPS}=R^*p_{LPS}$ and an interval of width $R_{MPS}=R-R_{LPS}$, where $p_{LPS}$ is an estimate of the probability of the least probable symbol (LPS), and MPS is the most probable symbol, with a probability of $1-p_{LPS}$. The value of $p_{LPS}$ is determined using the state value of the context model. If the offset falls in the subinterval $R_{LPS}$, the bin is decoded as the LPS and the subinterval is selected as the interval for decoding the next bin; otherwise, the bin is decoded as the MPS and $R_{MPS}$ is selected as the interval for decoding the next bin.

The range R is updated to be the selected subinterval. A renormalization process is then executed to rescale the range R and update the offset O if needed. The renormalization process iteratively scales the range R to a minimum value of 256 with successive left shifts by 1. The number of iterations needed depends on the value of the range R. In each iteration, the offset 0 ais also left shifted by 1 and the next bit in the bit stream is shifted into the offset. The de-binarizer 114 receives the decoded bins and operates to reverse the binarization of the binarizer 100 to reconstruct syntax elements.

For both entropy encoding and decoding, the context models are stored in memory and are continuously updated. This can require a significant amount of memory as there may be several hundred contexts. Because CABAC is a throughput bottleneck, it important to access the contexts quickly (without delay); otherwise there would be stall cycles. Furthermore, for high throughput, it is desirable to be able read a context model from memory, update it and write back the updated version to the same location in memory in a single cycle. In embedded codecs such as those implemented in cellular telephones, table computing devices, automobiles, set top boxes, and the like, designated on-chip memory such as static random access memory (SRAM), registers dedicated to CABAC contexts, and/or a combination thereof is used for storing context models in order to increase throughput. However, on-chip memory is expensive and using registers to store contexts requires significant chip area. Any reduction in the number of contexts used for CABAC directly reduces the amount of memory and/or chip area needed to store the context models.

Further, the contexts are initialized at the beginning of each slice in a video stream. In some applications, e.g., video conferencing, frames may have many slices. If the context initialization is done serially, this initialization can consume significant time. Reducing the number of contexts directly reduces the amount of time needed to initialize contexts, thus helping to improve CABAC throughput.

In WD3, the contexts used for CABAC coding of transform coefficient syntax elements account for 75% of the total contexts. More specifically, ninety six contexts are defined for entropy coding of significant coefficient flags. A significant coefficient flag, significant_coeff_flag, is encoded in the encoded video bit stream to indicate whether or not a location, i.e., frequency position, in a transform block contains a non-zero coefficient. For entropy coding of this flag, 15×2 contexts are defined for luma/chroma 4×4 transform blocks, 16×2 contexts are defined for luma/chroma 8×8 transform blocks, 4×2 contexts are defined for the first 2×2 positions (the low frequency region) in luma/chroma 16×16 transform blocks, 4 contexts are defined for the first 2×2 positions in luma 32×32 transform blocks, 12 contexts are defined to be shared between luma 16×16 transform blocks and luma 32×32 transform blocks, and 12 contexts are defined for chroma 16×16 transform blocks. Note that for entropy coding of significance coefficient flags in 16×16 and 32×32 luma transform blocks, all the context models are shared except those for the first 2×2 positions in such blocks, i.e., except for the 2×2 sub-block in the upper left corner in such blocks. This context sharing is conceptually illustrated in FIG. 2.

Also, the level (value) of a non-zero transform coefficient is encoded as some combination of three level indicators that indicate if the coefficient level is greater than 1, greater than 2, and, its actual value is greater than 3. These indicators are referred to respectively, as coeff_abs_level_greater1_flag, coeff_abs_level_greater2_flag, and coeff_abs_level_minus3. (In later versions of HEVC, coeff_abs_level_minus3 is replaced by another syntax element, coeff_abs_level_remaining.) Sixty contexts are defined for encoding of the coeff_abs_level_greater1_flag, thirty for luma and thirty for chroma.

FIG. 3 illustrates the context selection process for the coeff_abs_level_greater1_flag. In WD3, for purposes of context selection for coding of transform coefficient levels, the transform coefficient levels are divided into coefficient blocks, i.e., 4×4 sub-blocks of coefficient levels in a transform block. That is, a transform block is divided into 4×4 sub-blocks of consecutive coefficients (in scan order) for purposes of entropy encoding and decoding of the transform coefficient levels. As was previously mentioned, in WD3, sixty contexts are defined for encoding this flag (thirty for luma and thirty for chroma). For purposes of context selection, these sixty contexts are divided into twelve context sets, each having five contexts. Thus, there are six context sets for luma and six context sets for chroma. For each component (luma and chroma), there are three context sets for the lower frequency locations and three context sets for the remaining locations.

A context set is selected for each coefficient block in a transform block based on criteria such as: 1) whether the coefficient block contains the lowest frequency coefficients, i.e., the initial 2×2 block of coefficient levels; and 2) the number of non-zero coefficients in previous (in scan order)

coefficient blocks. Selection of a context set and the particular contexts in each context set is described in more detail in WD3.

FIG. 3 illustrates the context selection process once a context set is selected. In this process, a context index ctx is chosen that indicates which context in the context set to use. Also, the context selection process for the coeff_abs_level_greater1_flag uses a counter c1 to count the number of consecutive trailing ones. In general, in this context selection process, the context index ctx and counter c1 are incremented each consecutive time the coeff_abs_level_greater1_flag is set to zero for a non-zero coefficient level in a coefficient block, and the context associated with the incremented context index in the context set is selected for the next consecutive flag value. For consecutive zero-valued coeff_abs_level_greater1_flags after the third one, the context associated with index four in the context set is used. The first time a coeff_abs_level_greater1_flag is set to one, the context associated with index 0 in the context set is selected for any remaining coeff_abs_level_greater1_flags in the coefficient block, regardless of value.

The context selection process begins with the initial non-zero coefficient level in a coefficient block. Coefficients are scanned in zigzag order within a coefficient block. The counter c1 and the context index ctx are initialized to 1. If the coefficient level is less than one or equal to one, the value of the coeff_abs_level_greater1_flag for this non-zero coefficient level will be 0; otherwise it will be 1. The context associated with the index 1 in the context set is selected for the flag value. If the flag value is 1, the context associated with the index 0 in the context set is selected for any remaining coeff_abs_level_greater1_flags in the coefficient block, regardless of value. Note that coeff_abs_level_greater1_flags are only coded if a coefficient level is non-zero.

If the flag value is 0, the counter c1 and the context index ctx are incremented. The next non-zero coefficient level in the coefficient block, if any, is then processed. Again, if the coefficient level is less than one, the value of the coeff_abs_level_greater1_flag for this next non-zero coefficient level will be 0; otherwise it will be 1. The context associated with the index 2 in the context set is selected for the flag value. If the flag value is 1, the context associated with the index 0 in the context set is selected for any remaining coeff_abs_level_greater1_flags in the coefficient block, regardless of value.

If the flag value is 0, the counter c1 and the context index ctx are incremented. This process continues in a similar fashion until ctx=4. After that point, the context associated with index 4 is selected as the context for each subsequent coeff_abs_level_greater1_flag from the coefficient block unless and until a flag value is 1. The first time the value of the flag is 1, the context associated with index 4 is selected as the context for the flag, and the context associated with the index 0 in the context set is selected for any remaining coeff_abs_level_greater1_flags in the coefficient block, regardless of value.

As was previously mentioned, for entropy coding of significance coefficient flags in 16×16 and 32×32 luma transform blocks, all the context models are shared except those for the first 2×2 positions in such blocks. In the development of WD3, it was recognized that probability distributions of significant coefficient flag values for 16×16 luma transform blocks and 32×32 luma transform blocks were sufficiently similar across all coefficient positions except the four coefficient positions for the lowest four frequencies, i.e., the initial 2×2 positions in a transform block, that contexts could be shared between these two block sizes for coding of significant coefficient flags with the exception of the flags for the initial 2×2 positions. As is documented in H. Sasai and T. Nishi, "Simplified Context Modeling for Transform Coefficient Coding," JCTVC-D185, Joint Collaborative Team on Video Coding (JCT-VC) of ITU-T SG16 WP3 and ISO/IEC JTC1/SC29/WG11, Daegu, KR, Jan. 20-28, 2011 and H. Sasai and T. Nishi, "CE11: Context Size Reduction for the Significance Map," JCTVC-E227, Joint Collaborative Team on Video Coding (JCT-VC) of ITU-T SG16 WP3 and ISO/IEC JTC1/SC29/WG11, Geneva, CH, Mar. 16-23, 2011, at least some knowledgeable practitioners in the art believed that the probability distributions of the significant coefficient flag values for the initial 2×2 positions in a 16×16 transform block and the initial 2×2 positions in a 32×32 transform block would have different characteristics because these positions correspond to the lowest four frequencies. The lowest frequencies typically contain the most signal energy and, as a result, are likely be non-zero and contain signal information. Thus, the lowest frequency transform coefficients can potentially behave differently for different transform sizes and the contexts for encoding the significant coefficient flag values for these four positions should not be shared.

Similarly, the belief was that five contexts were needed in each context set for encoding of coefficient level flags, e.g., coeff_abs_level_greater1_flags, because coefficient blocks with three or more trailing ones would have different characteristics than coefficient blocks with four or more trailing ones. Thus, the fifth context in each context set was needed to distinguish between three trailing ones and four or more trailing ones. Trailing ones are consecutive coefficient levels of a coefficient block with a magnitude of one that are encountered before a coefficient level with magnitude greater than one is encountered when the coefficient block is processed in scan order.

Embodiments of the invention provide for simplified context selection for CABAC entropy encoding and decoding of transform coefficient syntax elements by reducing the number of contexts used. In some embodiments, rather than using separate contexts for entropy coding of significant coefficient flags for the four positions in luma 16×16 transform blocks and 32×32 luma transform blocks corresponding to the four lowest frequencies and sharing the contexts for entropy coding of significant coefficient flags for all other positions in these two luma transform block sizes, all contexts for all positions in these two luma transform blocks sizes are shared for entropy coding of significant coefficient flags. Note that in such embodiments, a context used for entropy coding significant coefficient flags for the position corresponding to the lowest frequency is shared between the two luma transform block sizes. The position in a transform block corresponding to the lowest frequency may be referred to as the DC or the DC position.

For example, assuming that four contexts are used for the four positions corresponding to the four lowest positions as in WD3 and twelve contexts are shared, the four contexts for the four lowest frequency positions would be shared between luma 16×16 transform blocks and luma 32×32 transform blocks in addition to the previously shared 12 contexts. Thus, all contexts for entropy coding of significant coefficient flags of luma 16×16 transform blocks and luma 32×32 transform blocks are shared. This example context sharing is conceptually illustrated in FIG. 4. This increased sharing of contexts in this example reduces the overall number of contexts by four over those defined in WD3 with negligible loss in coding efficiency.

In some such embodiments, a 32×32 chroma transform block may be used. Note that in WD3 a 32×32 transform is not defined for chroma. In such embodiments, all contexts for encoding significant coefficient flags for 16×16 luma transform blocks and 32×32 luma transform blocks are shared and all contexts for encoding significant coefficient flags for 16×16 chroma transform blocks and 32×32 chroma transform blocks are shared.

Figure 5:
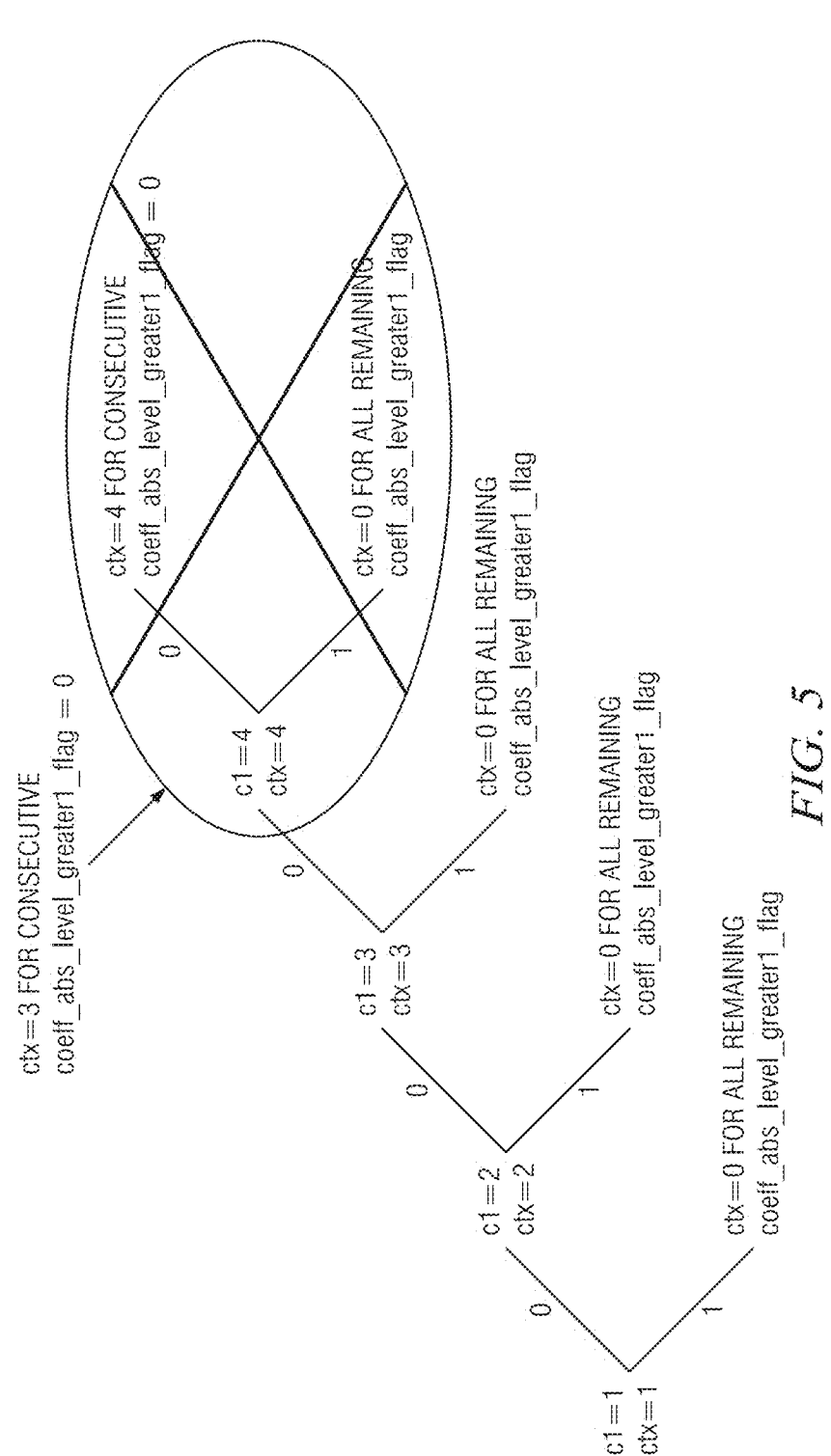
FIG. 5 illustrates a method for context selection.

In some embodiments, the number of contexts in each context set for entropy coding of coefficient level flags, e.g., coeff_abs_level_greater1_flag, is four. A coefficient level flag is a flag uses to signal the value of a non-zero coefficient level as compared to a threshold value. For example, the coeff_abs_level_greater1_flag of HEVC is used to signal that the absolute value of a non-zero coefficient level is greater than one. Using four contexts in a context set rather than the five of WD3 reduces the overall number of contexts by twelve (six for luma and six for chroma) with negligible loss in coding efficiency. The effect of this reduction on the context selection process of FIG. 3 is illustrated in FIG. 5. The incrementing of the context index ctx stops at ctx=3, rather than ctx=4.

FIG. 6 shows a block diagram of a digital system that includes a source digital system 600 that transmits encoded video sequences to a destination digital system 602 via a communication channel 616. The source digital system 600 includes a video capture component 604, a video encoder component 606, and a transmitter component 608. The video capture component 604 is configured to provide a video sequence to be encoded by the video encoder component 606. The video capture component 604 may be, for example, a video camera, a video archive, or a video feed from a video content provider. In some embodiments, the video capture component 604 may generate computer graphics as the video sequence, or a combination of live video, archived video, and/or computer-generated video.

The video encoder component 606 receives a video sequence from the video capture component 604 and encodes it for transmission by the transmitter component 608. The video encoder component 606 receives the video sequence from the video capture component 604 as a sequence of pictures, divides the pictures into largest coding units (LCUs), and encodes the video data in the LCUs. The video encoder component 606 may be configured to perform CABAC encoding with simplified context selection as described herein during the encoding process. An embodiment of the video encoder component 606 is described in more detail herein in reference to FIG. 7.

The transmitter component 608 transmits the encoded video data to the destination digital system 602 via the communication channel 616. The communication channel 616 may be any communication medium, or combination of communication media suitable for transmission of the encoded video sequence, such as, for example, wired or wireless communication media, a local area network, or a wide area network.

The destination digital system 602 includes a receiver component 610, a video decoder component 612 and a display component 614. The receiver component 610 receives the encoded video data from the source digital system 600 via the communication channel 616 and provides the encoded video data to the video decoder component 612 for decoding. The video decoder component 612 reverses the encoding process performed by the video encoder component 606 to reconstruct the LCUs of the video sequence. The video decoder component 612 may be configured to perform CABAC encoding with simplified context selection as described herein during the decoding process. An embodiment of the video decoder component 612 is described in more detail below in reference to FIG. 8.

The reconstructed video sequence is displayed on the display component 614. The display component 614 may be any suitable display device such as, for example, a plasma display, a liquid crystal display (LCD), a light emitting diode (LED) display, etc.

In some embodiments, the source digital system 600 may also include a receiver component and a video decoder component and/or the destination digital system 602 may include a transmitter component and a video encoder component for transmission of video sequences both directions for video steaming, video broadcasting, and video telephony. Further, the video encoder component 606 and the video decoder component 612 may perform encoding and decoding in accordance with one or more video compression standards. The video encoder component 606 and the video decoder component 612 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 7:
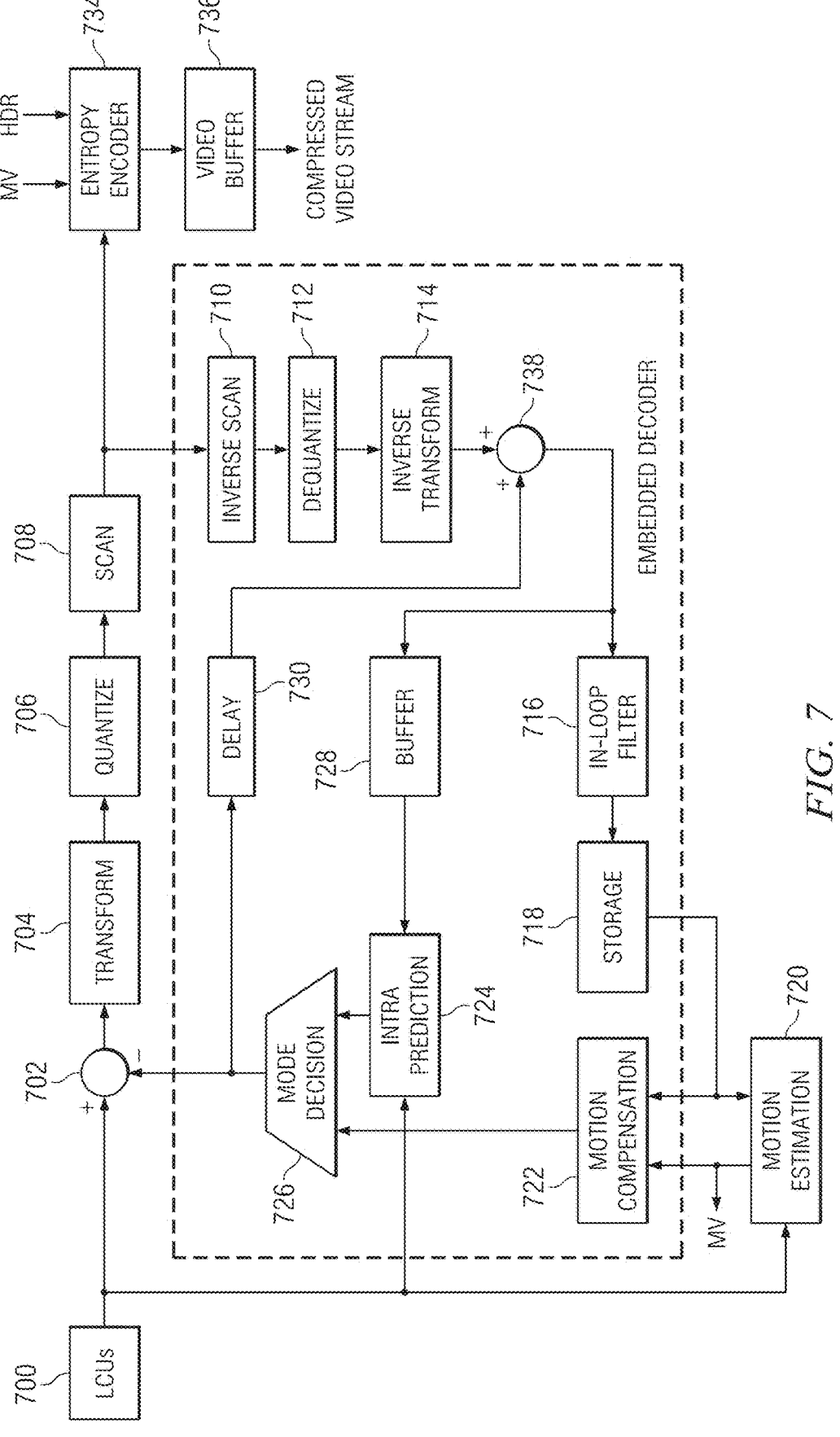
FIG. 7 is a block diagram of a video encoder.

FIG. 7 shows a block diagram of the LCU processing portion of an example video encoder. A coding control component (not shown) sequences the various operations of the LCU processing, i.e., the coding control component runs the main control loop for video encoding. The coding control component receives a digital video sequence and performs any processing on the input video sequence that is to be done at the picture level, such as determining the coding type (I, P, or B) of a picture based on the high level coding structure, e.g., IPPP, IBBP, hierarchical-B, and dividing a picture into LCUs for further processing. The coding control component also may determine the initial LCU CU structure for each CU and provides information regarding this initial LCU CU structure to the various components of the video encoder as needed. The coding control component also may determine the initial PU and TU structure for each CU and provides information regarding this initial structure to the various components of the video encoder as needed.

In addition, for pipelined architectures in which multiple PUs and CUs may be processed concurrently in different components of the LCU processing, the coding control component controls the processing of PUs and CUs by various components of the LCU processing in a pipeline fashion. For example, in many embedded systems supporting video processing, there may be one master processor and one or more slave processing modules, e.g., hardware accelerators. The master processor operates as the coding control component and runs the main control loop for video encoding, and the slave processing modules are employed to off load certain compute-intensive tasks of video encoding such as motion estimation, motion compensation, intra prediction mode estimation, transformation and quantization, entropy coding, and loop filtering. The slave processing modules are controlled in a pipeline fashion by the master processor such that the slave processing modules operate on different blocks of a picture at any given time. That is, the slave processing modules are executed in parallel, each processing its respective block while data movement from one processor to another is serial.

The LCU processing receives LCUs of the input video sequence from the coding control component and encodes the LCUs under the control of the coding control component to generate the compressed video stream. The CUs in the CU structure of an LCU may be processed by the LCU processing in a depth-first Z-scan order. The LCUs 700 from the coding control unit are provided as one input of a motion estimation component 720, as one input of an intra-prediction component 724, and to a positive input of a combiner 702 (e.g., adder or subtractor or the like). Further, although not specifically shown, the prediction mode of each picture as selected by the coding control component is provided to a mode selector component and the entropy encoder 734.

The storage component 718 provides reference data to the motion estimation component 720 and to the motion compensation component 722. The reference data may include one or more previously encoded and decoded CUs, i.e., reconstructed CUs.

The motion estimation component 720 provides motion data information to the motion compensation component 722 and the entropy encoder 734. More specifically, the motion estimation component 720 performs tests on CUs in an LCU based on multiple inter-prediction modes (e.g., skip mode, merge mode, and normal or direct inter-prediction) and transform block sizes using reference picture data from storage 718 to choose the best motion vector(s)/prediction mode based on a rate distortion coding cost. To perform the tests, the motion estimation component 720 may begin with the CU structure provided by the coding control component. The motion estimation component 720 may divide each CU indicated in the CU structure into PUs according to the unit sizes of prediction modes and into transform units according to the transform block sizes and calculate the coding costs for each prediction mode and transform block size for each CU. The motion estimation component 720 may also compute CU structure for the LCU and PU/TU partitioning structure for a CU of the LCU by itself.

For coding efficiency, the motion estimation component 720 may also decide to alter the CU structure by further partitioning one or more of the CUs in the CU structure. That is, when choosing the best motion vectors/prediction modes, in addition to testing with the initial CU structure, the motion estimation component 720 may also choose to divide the larger CUs in the initial CU structure into smaller CUs (within the limits of the recursive quadtree structure), and calculate coding costs at lower levels in the coding hierarchy. If the motion estimation component 720 changes the initial CU structure, the modified CU structure is communicated to other components that need the information.

The motion estimation component 720 provides the selected motion vector (MV) or vectors and the selected prediction mode for each inter-predicted PU of a CU to the motion compensation component 722 and the selected motion vector (MV), reference picture index (indices), prediction direction (if any) to the entropy encoder 734

The motion compensation component 722 provides motion compensated inter-prediction information to the mode decision component 726 that includes motion compensated inter-predicted PUs, the selected inter-prediction modes for the inter-predicted PUs, and corresponding transform block sizes. The coding costs of the inter-predicted PUs are also provided to the mode decision component 726.

The intra-prediction component 724 provides intra-prediction information to the mode decision component 726 that includes intra-predicted PUs and the corresponding intra-prediction modes. That is, the intra-prediction component 724 performs intra-prediction in which tests based on multiple intra-prediction modes and transform unit sizes are performed on CUs in an LCU using previously encoded neighboring PUs from the buffer 728 to choose the best intra-prediction mode for each PU in the CU based on a coding cost.

To perform the tests, the intra-prediction component 724 may begin with the CU structure provided by the coding control. The intra-prediction component 724 may divide each CU indicated in the CU structure into PUs according to the unit sizes of the intra-prediction modes and into transform units according to the transform block sizes and calculate the coding costs for each prediction mode and transform block size for each PU. For coding efficiency, the intra-prediction component 724 may also decide to alter the CU structure by further partitioning one or more of the CUs in the CU structure. That is, when choosing the best prediction modes, in addition to testing with the initial CU structure, the intra-prediction component 724 may also choose to divide the larger CUs in the initial CU structure into smaller CUs (within the limits of the recursive quadtree structure), and calculate coding costs at lower levels in the coding hierarchy. If the intra-prediction component 724 changes the initial CU structure, the modified CU structure is communicated to other components that need the information. Further, the coding costs of the intra-predicted PUs and the associated transform block sizes are also provided to the mode decision component 726.

The mode decision component 726 selects between the motion-compensated inter-predicted PUs from the motion compensation component 722 and the intra-predicted PUs from the intra-prediction component 724 based on the coding costs of the PUs and the picture prediction mode provided by the mode selector component. The decision is made at CU level. Based on the decision as to whether a CU is to be intra- or inter-coded, the intra-predicted PUs or inter-predicted PUs are selected, accordingly.

The output of the mode decision component 726, i.e., the predicted PU, is provided to a negative input of the combiner 702 and to a delay component 730. The associated transform block size is also provided to the transform component 704. The output of the delay component 730 is provided to another combiner (i.e., an adder) 738. The combiner 702 subtracts the predicted PU from the current PU to provide a residual PU to the transform component 704. The resulting residual PU is a set of pixel difference values that quantify differences between pixel values of the original PU and the predicted PU. The residual blocks of all the PUs of a CU form a residual CU block for the transform component 704.

The transform component 704 performs block transforms on the residual CU to convert the residual pixel values to transform coefficients and provides the transform coefficients to a quantize component 706. The transform component 704 receives the transform block sizes for the residual CU and applies transforms of the specified sizes to the CU to generate transform coefficients.

The quantize component 706 quantizes the transform coefficients based on quantization parameters (QPs) and quantization matrices provided by the coding control component and the transform sizes. The quantized transform coefficients are taken out of their scan ordering by a scan component 708 and arranged sequentially for entropy coding. In essence, the scan component 708 scans backward through the coefficients of the transform block to serialize the coefficients for entropy coding. A large region of a transform block in the higher frequencies is typically zero. The scan component 708 does not send such large regions of zeros in transform blocks for entropy coding. Rather, the scan component 708 may start with the highest frequency position in the transform block and scans the coefficients backward in highest to lowest frequency order until a coefficient with a non-zero value is located. Once the first coefficient with a non-zero value is located, that coefficient and all remaining coefficient values following the coefficient in the highest to lowest frequency scan order are serialized and passed to the entropy encoder 734.

The entropy encoder 734 uses CABAC to entropy encode the relevant data, i.e., syntax elements, output by the various encoding components and the coding control component to generate the compressed video bit stream. The syntax elements are encoded according to the syntactical order specified in HEVC. This syntactical order specifies the order in which syntax elements should occur in a compressed video bit stream.

As was previously discussed, HEVC defines several syntax elements for encoding transform coefficient levels including a significant coefficient flag, significant_coeff_flag, and a coefficient level flag, coeff_abs_level_greater1_flag. Further, for coding of transform coefficient levels, a transform block is divided into sub-blocks of consecutive coefficients (in scan order) referred to as coefficient blocks. The number of coefficients in a coefficient block is specified by the video coding standard. For example, in HEVC, a coefficient block is a set of sixteen consecutive coefficients in scan order.

In some embodiments, 16×16 transform sizes for luma and chroma and 32×32 transform sizes for luma are supported. In such embodiments, one set of contexts is defined for entropy encoding the significant coefficient flags of 16×16 luma transform blocks and 32×32 luma transform blocks. That is, all of the contexts for coding all values of the significant coefficient flags for a 16×16 luma transform block and a 32×32 luma transform block are shared. When encoding a significant coefficient flag value for a 16×16 luma transform block or a 32×32 luma transform block, the entropy encoder 734 selects a context from this shared set of contexts for either block size. The shared contexts and the criteria for selecting a context from the shared contexts are defined by the video coding standard. For example, in HEVC draft 7, seven shared contexts are defined for 16×16 and 32×32 luma transform blocks: one context for the lowest frequency (DC) coefficient, three contexts for the next fifteen lowest frequency coefficients, and three contexts for the remaining higher frequency coefficients. The particular context selected for coding a significant coefficient flag of a coefficient level depends on the location of the coefficient in the transform block and/or if there are non-zero coefficients in right and bottom neighboring coefficient blocks. A detailed description of this context selection is provided in HEVC draft 7.

In some embodiments, 16×16 transform sizes for luma and chroma and 32×32 transform sizes for luma and chroma are supported. In such embodiments, one set of contexts is defined for encoding the significant coefficient flags of 16×16 luma transform blocks and 32×32 luma transform blocks and one set of contexts is defined for encoding the significant coefficient flags of 16×16 chroma transform blocks and 32×32 chroma transform blocks. The sharing of contexts for encoding significant coefficient flags of 16×16 luma transform blocks and 32×32 luma transform blocks is previously described. When encoding a significant_coeff_flag value for a 16×16 chroma transform block or a 32×32 chroma transform block, the entropy encoder 734 selects a context from the shared set of contexts for either block size. The shared contexts and the criteria for selecting a context from the shared contexts are defined by the video coding standard. For example, HEVC draft 7 defines contexts for encoding of significant coefficient flags for 16×16 chroma transform blocks and criteria for selecting a context. The same contexts and selection criteria may be used for encoding of significant coefficient flags for 32×32 chroma transform blocks.

Figure 11:
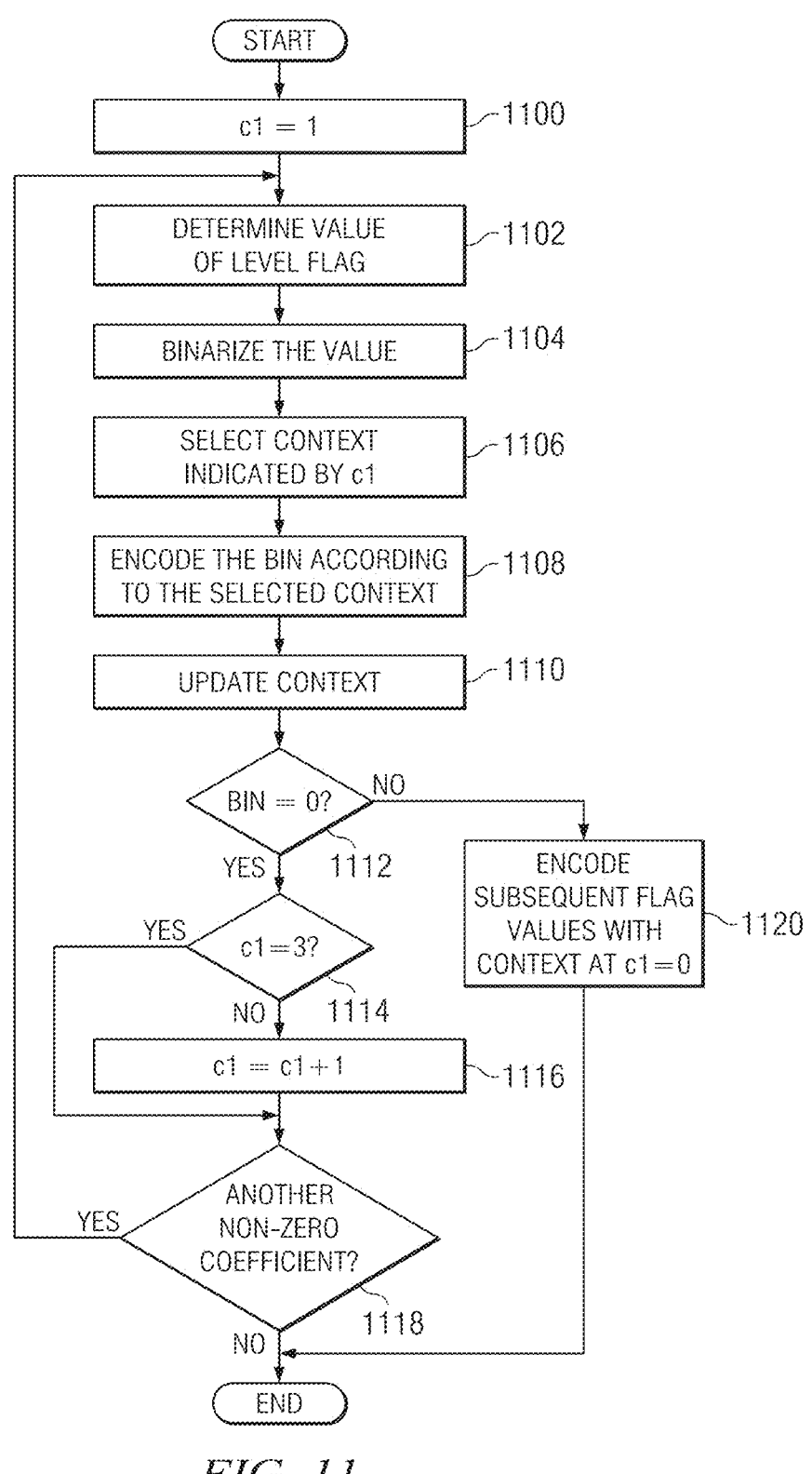

In some embodiments, the entropy encoder 734 selects a context set for encoding values of a coefficient level flag, e.g., coeff_abs_level_greater1_flag, for non-zero coefficients in a coefficient block, and then selects the context for encoding each flag value of the coefficient block from the selected context set as described in the method of FIG. 11. The contexts for coding a coefficient level flag, the contexts in each context set, and the criteria for selecting a context set for a coefficient block are defined in the video coding standard. For example, a context set may be selected based on the number of trailing ones in the previous context block (in scan order). An example of contexts, context sets, and context set selection criteria for coding a coeff_abs_level_greater1_flag may be found, for example, in HEVC Draft 7.

The LCU processing includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures. To determine the reconstructed input, i.e., reference data, the ordered quantized transform coefficients for a CU provided via the scan component 708 are returned to their original post-transform arrangement by an inverse scan component 710, the output of which is provided to a dequantize component 712, which outputs a reconstructed version of the transform result from the transform component 704.

The dequantized transform coefficients are provided to the inverse transform component 714, which outputs estimated residual information which represents a reconstructed version of a residual CU. The inverse transform component 714 receives the transform block size used to generate the transform coefficients and applies inverse transform(s) of the specified size to the transform coefficients to reconstruct the residual values.

The reconstructed residual CU is provided to the combiner 738. The combiner 738 adds the delayed selected CU to the reconstructed residual CU to generate a reconstructed CU, which becomes part of reconstructed picture information. The reconstructed picture information is stored in a buffer 728 for use by the intra-prediction component 724 and is provided to an in-loop filter component 716. The in-loop filter component 716 applies various filters to the reconstructed picture data to generate final reference picture data. The filtering may be performed, for example, on an LCU-by-LCU basis or on a picture basis. This filtering is performed to improve the reference pictures used for encoding/decoding of subsequent pictures. The in-loop filter component 716 may, for example, adaptively apply low-pass filters to block boundaries according to the boundary strength to alleviate blocking artifacts causes by the block-based video coding. The final reference picture data is provided to storage component 718.

Figure 8:
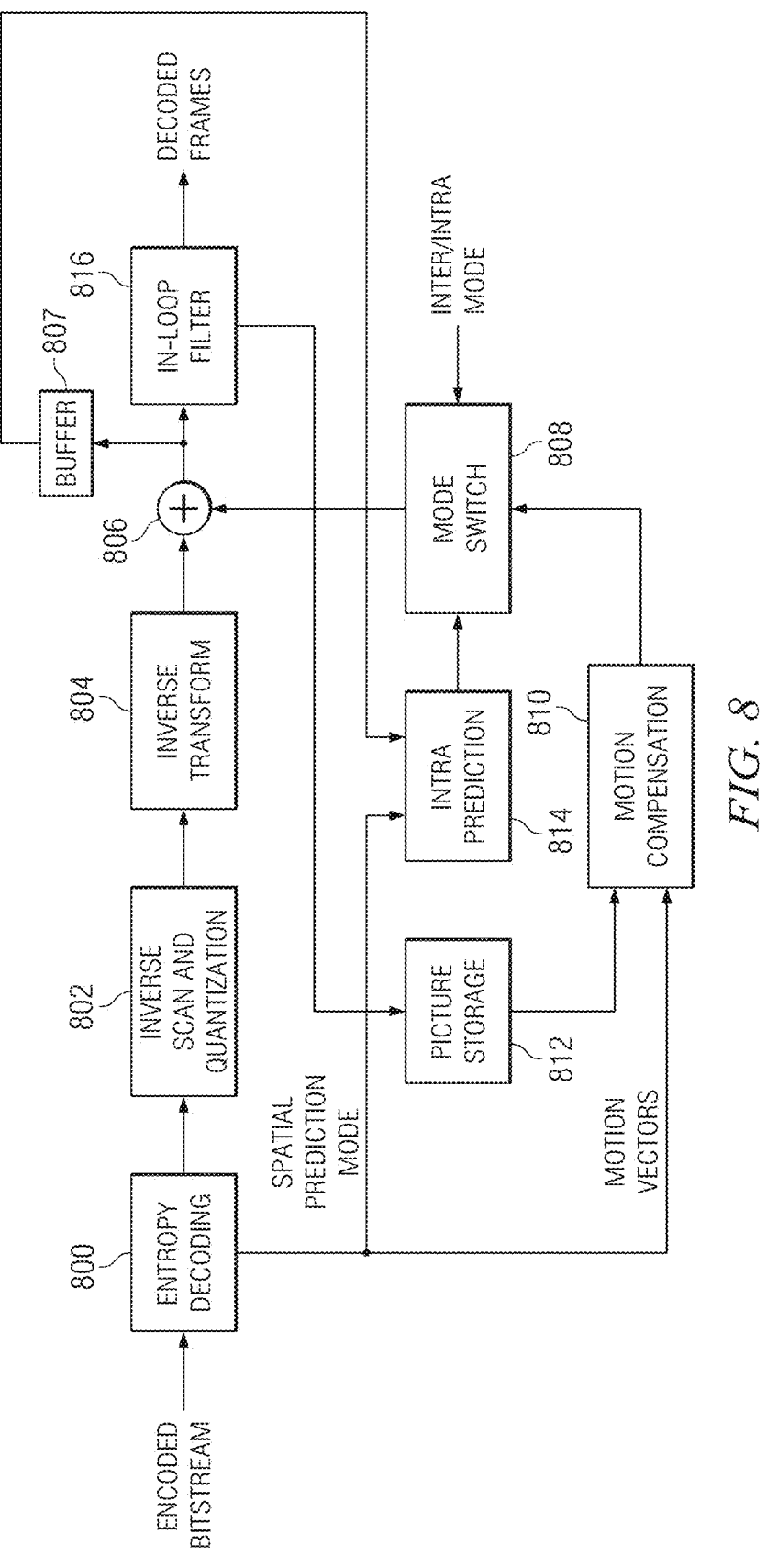
FIG. 8 is a block diagram of a video decoder.

FIG. 8 shows a block diagram of an example video decoder. The video decoder operates to reverse the encoding operations, i.e., entropy coding, quantization, transformation, and prediction, performed by the video encoder of FIG. 7 to regenerate the pictures of the original video sequence. In view of the above description of a video encoder, one of ordinary skill in the art will understand the functionality of components of the video decoder without detailed explanation.

The entropy decoding component 800 receives an entropy encoded (compressed) video bit stream and reverses the entropy coding, i.e., performs CABAC decoding, to recover the encoded syntax elements and provides the syntax elements to the appropriate component. The entropy decoding component 800 uses the same contexts and same context selection criteria as the entropy coding in the encoder. Thus, in some embodiments, the contexts for decoding values of significant coefficient flags for 16×16 luma transform block and 32×32 luma transform blocks are shared.

And in some such embodiments, the contexts for decoding values of significant coefficient flags for 16×16 chroma transform blocks and 32×32 chroma transform blocks are shared. The selection of a particular context from the shared contexts is performed in the same way as the selection in the encoder. And, in some embodiments, the entropy decoding component 800 selects a context set for decoding values of coefficient level flags for non-zero coefficients in a coefficient block of a transform block, and then selects the context for decoding each coefficient level flag value of the coefficient block from the selected context set as described in the method of FIG. 12. The selection of the context set is performed in the same way as the selection in the encoder.

The inverse scan and inverse quantization component 802 receives entropy decoded quantized transform coefficients from the entropy decoding component 800, inverse scans the coefficients to return the coefficients to their original post-transform arrangement, i.e., performs the inverse of the scan performed by the scan component 708 of the encoder to reconstruct quantized transform blocks, and de-quantizes the quantized transform coefficients. The forward scanning in the encoder is a conversion of the two dimensional (2D) quantized transform block to a one dimensional (1D) sequence; the inverse scanning performed here is a conversion of the 1D sequence to the two dimensional quantized transform block.

The inverse transform component 804 transforms the frequency domain data from the inverse quantization component 802 back to the residual CU. That is, the inverse transform component 804 applies an inverse unit transform, i.e., the inverse of the unit transform used for encoding, to the de-quantized residual coefficients to produce the residual CUs.

A residual CU supplies one input of the addition component 806. The other input of the addition component 806 comes from the mode switch 808. When an inter-prediction mode is signaled in the encoded video stream, the mode switch 808 selects predicted PUs from the motion compensation component 810 and when an intra-prediction mode is signaled, the mode switch selects predicted PUs from the intra-prediction component 814.

The motion compensation component 810 receives reference data from storage 812 and applies the motion compensation computed by the encoder and transmitted in the encoded video bit stream to the reference data to generate a predicted PU. That is, the motion compensation component 810 uses the motion vector(s) from the entropy decoder 800 and the reference data to generate a predicted PU.

The intra-prediction component 814 receives reconstructed samples from previously reconstructed PUs of a current picture from the buffer 807 and performs the intra-prediction computed by the encoder as signaled by an intra-prediction mode transmitted in the encoded video bit stream using the reconstructed samples as needed to generate a predicted PU.

The addition component 806 generates a reconstructed CU by adding the predicted PUs selected by the mode switch 808 and the residual CU. The output of the addition component 806, i.e., the reconstructed CUs, supplies the input of the in-loop filter component 816 and is also stored in the buffer 807 for use by the intra-prediction component 814.

The in-loop filter component 816 performs the same filtering as the encoder. The output of the in-loop filter component 816 is the decoded pictures of the video bit stream. Further, the output of the in-loop filter component 816 is stored in storage 812 to be used as reference data by the motion compensation component 810.

FIGS. 9-12 are flow diagrams of methods for simplified context selection in CABAC coding of transform coefficient syntax elements. These methods assume that for coding of transform coefficient levels, a transform block is divided into sub-blocks of consecutive coefficients (in scan order) referred to as coefficient blocks. The number of coefficients in a coefficient block is specified by the video coding standard in use. In some embodiments, a coefficient block is a set of sixteen consecutive coefficients in scan order. Further, the coefficient levels within a coefficient block are processed in scan order. The scan order is defined by the video coding standard in use. For example, the scan order may be a diagonal scan from the highest frequency position to the lowest frequency position. Examples of a suitable coefficient block size and scan order may be found in HEVC draft 7.

Referring now to FIG. 9, this figure is a flow diagram of a method for CABAC encoding of significant coefficient flag values of a coefficient block from a 16×16 luma transform block or a 32×32 luma transform block. A significant coefficient flag indicates whether or not a coefficient level in the coefficient block is non-zero. Initially, the value of the significant coefficient flag for a coefficient level in the coefficient block is determined 900. If the coefficient level is non-zero, the significant coefficient flag value is set to 1; otherwise, it is set to zero. The significant coefficient flag value is then binarized 902. Binarization of a significant coefficient flag is defined by the video coding standard in use. An example of a suitable binarization process may be found in HEVC draft 7. Binarization of the flag is assumed to result in a single bin.

A context for the bin is then selected 904 from the contexts defined for CABAC coding of significant coefficient flag values for 16×16 luma transform blocks and 32×32 luma transform blocks. These contexts are the same for the two block sizes. For example, if the defined contexts are A, B, C, and D, and the coefficient block is from a 16×16 luma transform block, one of these four contexts is selected for encoding the bin. And, if the coefficient block is from a 32×32 luma transform block, one of these same four contexts is selected for encoding the bin. The contexts, the initialization of the contexts, and the criteria for selecting a context are defined by the video coding standard in use. Examples may be found in HEVC draft 7.

The bin is then encoded 906 using arithmetic coding according to the current state of the selected context and the context is updated 908 to reflect the state transition in the context model caused by the bin value. The process is then repeated for the next transform coefficient level in the coefficient block, if any 910.

FIG. 10 is a flow diagram of a method for CABAC decoding of significant coefficient flag values of a coefficient block from a 16×16 luma transform block or a 32×32 luma transform block. Initially, a context is selected 1000 for a bin corresponding to a significant coefficient flag. The context is selected from the contexts defined for CABAC coding of significant coefficient flag values for 16×16 luma transform blocks and 32×32 luma transform blocks. These contexts are the same for the two block sizes. For example, if the defined contexts are A, B, C, and D, and the coefficient block is from a 16×16 luma transform block, one of these four contexts is selected for decoding the bin. And, if the coefficient block is from a 32×32 luma transform block, one of these same four contexts is selected for decoding the bin. The contexts, the initialization of the contexts, and the criteria for selecting a context are defined by the video coding standard in use. Examples may be found in HEVC draft 7.

The bin is then decoded 1002 using arithmetic decoding according to the current state of the selected context and the context is updated 1004 to reflect the state transition in the context model caused by the bin value. Debinarization is then performed to determine 1006 the value of the significant coefficient flag. Debinarization of a significant coefficient flag is defined by the video coding standard in use. An example of a suitable debinarization process may be found in HEVC draft 7. The process is then repeated for the next transform coefficient in the coefficient block, if any 1008.

In some embodiments, a video coding standard specifies a 16×16 chroma transform block and a 32×32 chroma transform block as well as the same for luma. In such embodiments, shared contexts are defined for coding the significant coefficient flags for the two chroma transform block sizes. Methods similar to those of FIGS. 9 and 10 are used to encode/decode the significant coefficient flag values of coefficient blocks from chroma transform blocks of these two sizes.

FIG. 11 is a flow diagram of a method for CABAC encoding of coefficient level flag values for a coefficient block. A coefficient level flag is a flag used to signal the value of a non-zero coefficient level as compared to a threshold value. For example, the coeff_abs_level_greater1_flag of HEVC is used to signal that the absolute value of a non-zero coefficient level is greater than one. This method assumes that a context set has been selected for the coefficient block from some number of context sets that are defined for CABAC encoding the coefficient level. The context set includes four contexts. The contexts, the context sets, and the criteria for selecting a context set are defined by the video coding standard in use. An example of contexts, context sets, and criteria for selection of a context set for encoding one such level flag, coeff_abs_level_greater1_flag, may be found in HEVC draft 7. The contexts in the context set are ordered such that each one may be selected by a unique index into the context set. For example, if a context set includes contexts A, B, C, and D, an index value of 0 is associated with context A, an index value of 1 is associated with context B, etc.

As shown in FIG. 11, before processing the coefficient levels in coefficient block, a context index c1 is initialized 1100 to a value of one. The value of the coefficient level flag for a non-zero coefficient level is then determined 1102. If the absolute value of the non-zero coefficient level is greater than one, the value of the coefficient level flag is one; otherwise, the value is zero. The coefficient level flag value is then binarized 1104. Binarization of a coefficient level flag is defined by the video coding standard in use. An example of a suitable binarization process may be found in HEVC draft 7. Binarization of the flag is assumed to result in a single bin.

The context indicated by the value of the index c1 is then selected from the context set 1106 and the bin is encoded 1108 using arithmetic encoding according to the current state of the selected context. The context is also updated 1110 to reflect the state transition in the context model caused by the bin value. If the value of the bin is zero 1112, and the value of the index c1 is not three 1114, the index c1 is increased 1116 by one. If the value of the bin is zero 1112, and the value of the index c1 is three 1114, the value of the index c1 is not changed. The next non-zero coefficient in the coefficient block, if any 1118, is then processed.

If the value of the bin is not zero 1112, then all subsequent coefficient level flag values for the coefficient block, if any, are encoded using the same context, the context at index zero in the context set. That is, for each subsequent non-zero coefficient level, the value of the coefficient level flag is determined, the value is binarized, the bin is encoded using arithmetic coding according to the current state of the context at index zero in the context set, and that context is updated.

Figure 12:
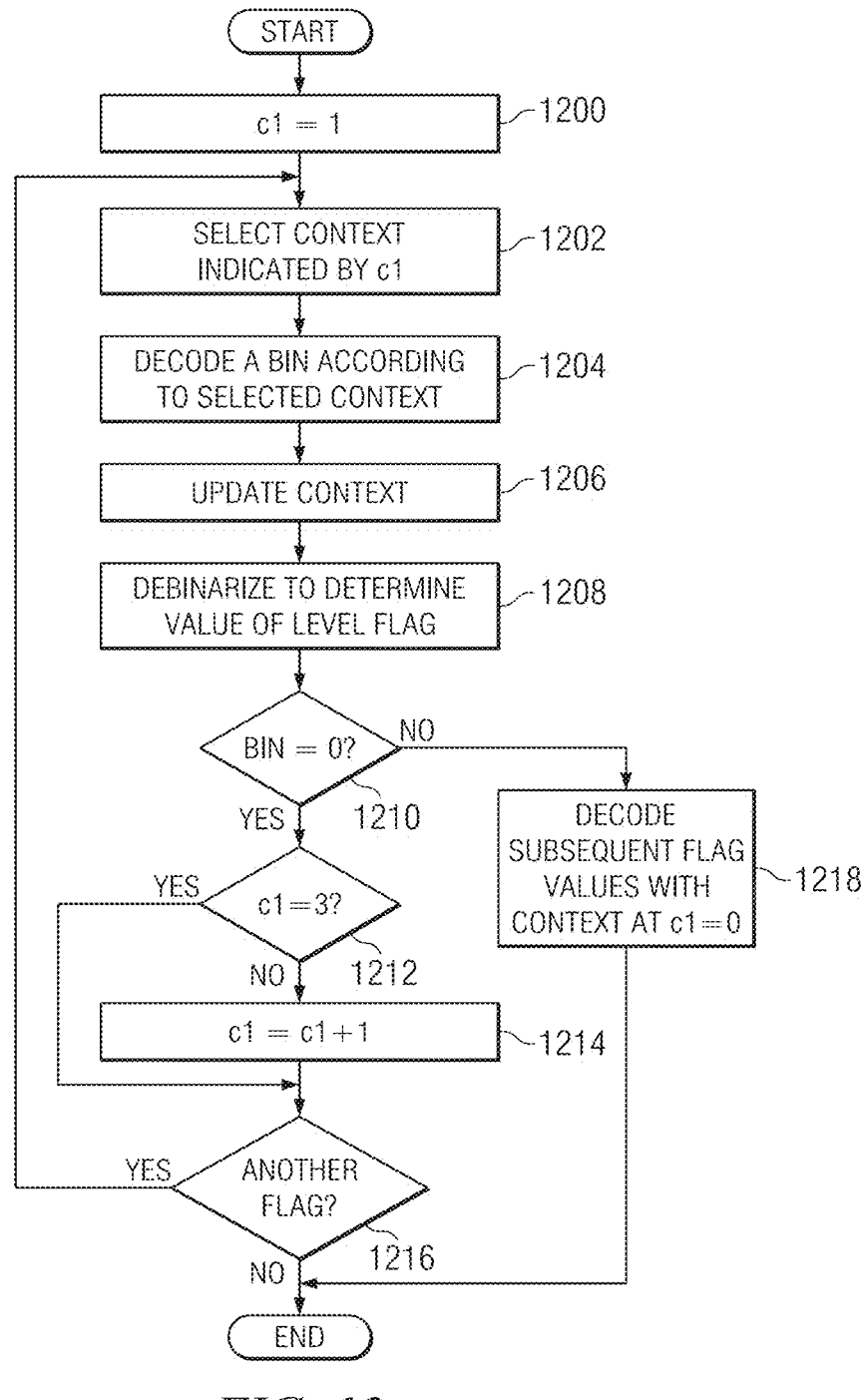

FIG. 12 is a flow diagram of a method for CABAC decoding of coefficient level flag values for a coefficient block. A coefficient level flag is a flag used to signal the value of a non-zero coefficient level as compared to a threshold value. For example, the coeff_abs_level_greater1_flag of HEVC is used to signal that the absolute value of a non-zero coefficient level is greater than one. This method assumes that a context set has been selected for the coefficient block from some number of context sets that are defined for CABAC decoding the coefficient level. The context set includes four contexts. The contexts, the context sets, and the criteria for selecting a context set are defined by the video coding standard in use. An example of contexts, context sets, and criteria for selection of a context set for encoding one such level flag, coeff_abs_level_greater1_flag, may be found in HEVC draft 7. The contexts in the context set are ordered such that each one may be selected by a unique index into the context set. For example, if a context set includes contexts A, B, C, and D, an index value of zero is associated with A, an index value of one is associated with B, etc.

As shown in FIG. 12, before processing the coefficient levels in a coefficient block encoded in a compressed bit stream, a context index c1 is initialized 1200 to a value of one. The context indicated by the value of the index c1 is then selected from the context set 1202, and a bin is decoded 1204 using arithmetic decoding according to the current state of the selected context. The context is also updated 1206 to reflect the state transition in the context model caused by the bin value. Debinarization is then performed to determine 1208 the value of a coefficient level flag. Debinarization of a coefficient level flag is defined by the video coding standard in use. An example of a suitable debinarization process may be found in HEVC draft 7.

If the value of the decoded bin is zero 1210, and the value of the index c1 is not three 1212, the index c1 is increased 1214 by one. If the value of the bin is zero 1210, and the value of the index c1 is three 1212, the value of the index c1 is not changed. The next bin corresponding to a coefficient level flag in the coefficient block, if any 1216, is then processed.

If the value of the bin is not zero 1210, then all subsequent bins for coefficient level flag values for the coefficient block, if any, are decoded using the same context, the context at index zero in the context set. That is, for each subsequent bin corresponding to a coefficient level flag, the bin is decoded using arithmetic decoding according to the current state of the context at index zero in the context set, that context is updated, and debinarization is performed to determine the flag value.

Figure 13:
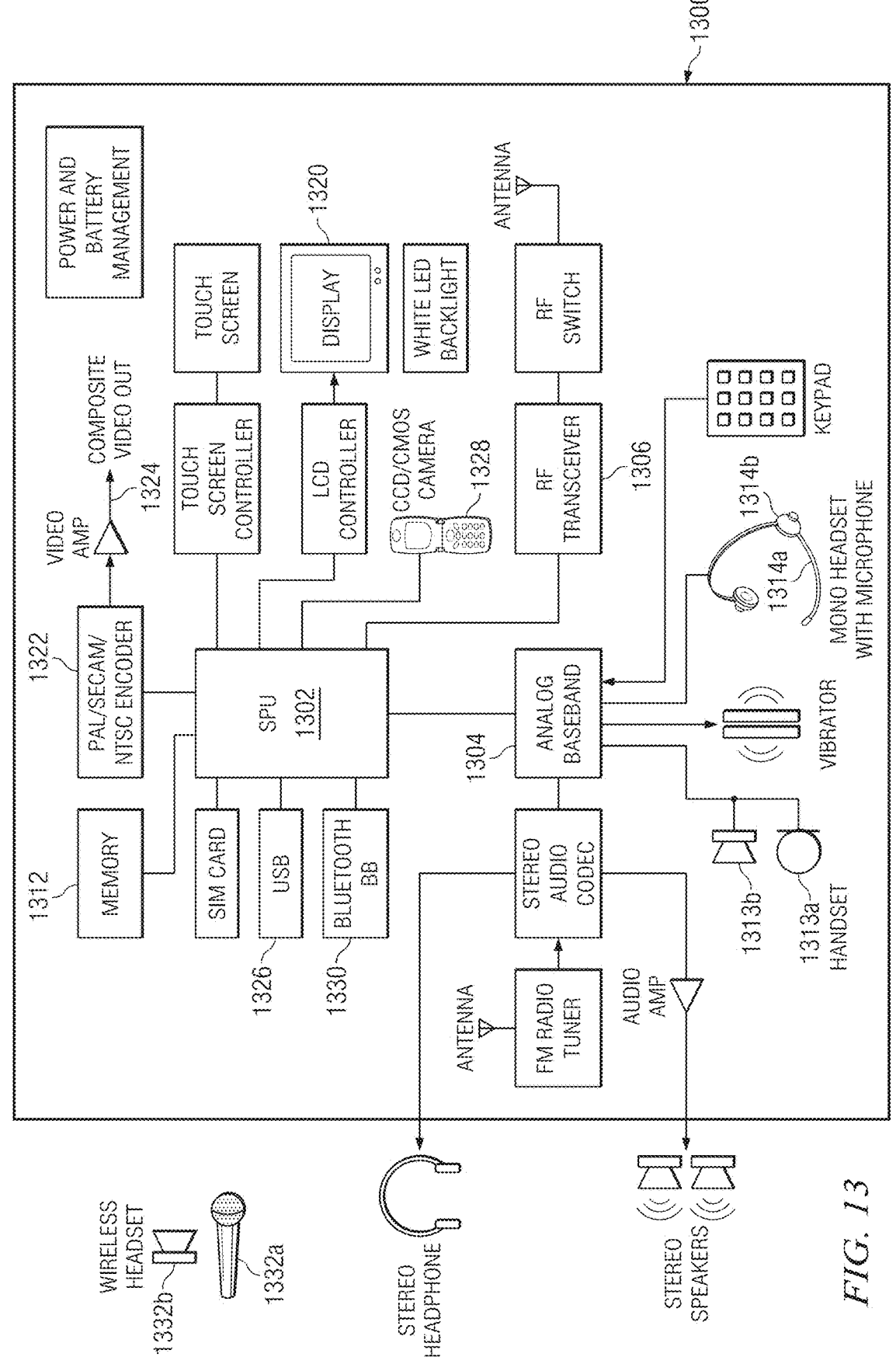
FIG. 13 is a block diagram of an illustrative digital system.

Embodiments of the methods, encoders, and decoders described herein may be implemented for virtually any type of digital system (e.g., a desk top computer, a laptop computer, a tablet computing device, a netbook computer, a handheld device such as a mobile (i.e., cellular) phone, a personal digital assistant, a digital camera, a set top box, a digital video recorder, etc.). FIG. 13 is a block diagram of a digital system 1300 (e.g., a mobile cellular telephone) that may be configured to use techniques described herein.

As shown in FIG. 13, the signal processing unit (SPU) 1302 includes a digital signal processing system (DSP) that includes embedded memory and security features. The analog baseband unit 1304 receives a voice data stream from the handset microphone 1313*a* and sends a voice data stream to the handset mono speaker 1313*b*. The analog baseband unit 1304 also receives a voice data stream from the microphone 1314*a* or 1332*a* and sends a voice data stream to the mono headset 1314*b* or wireless headset 1332*b*. The analog baseband unit 1304 and the SPU 1302 may be separate ICs. In many embodiments, the analog baseband unit 1304 does not embed a programmable processor core, but performs processing based on configuration of audio paths, filters, gains, etc being setup by software running on the SPU 1302.

The display 1320 may display pictures and video sequences received from a local camera 1328, or from other sources such as the USB 1326 or the memory 1313. The SPU 1302 may also send a video sequence to the display 1320 that is received from various sources such as the cellular network via the RF transceiver 1306 or the Bluetooth interface 1330. The SPU 1302 may also send a video sequence to an external video display unit via the encoder unit 1322 over a composite output terminal 1324. The encoder unit 1322 may provide encoding according to PAL/SECAM/NTSC video standards.

The SPU 1302 includes functionality to perform the computational operations required for video encoding and decoding. In one or more embodiments, the SPU 1302 is configured to perform computational operations for applying one or more techniques for CABAC encoding with simplified context selection as described herein during the encoding process. Software instructions implementing all or part of the techniques may be stored in the memory 1312 and executed by the SPU 1302, for example, as part of encoding video sequences captured by the local camera 1328. The SPU 1302 is also configured to perform computational operations for applying one or more techniques for CABAC decoding with simplified context selection as described herein as part of decoding a received coded video sequence or decoding a coded video sequence stored in the memory 1312. Software instructions implementing all or part of the techniques may be stored in the memory 1312 and executed by the SPU 1302.

OTHER EMBODIMENTS

While the invention has been described with respect to a limited number of embodiments, those skilled in the art, having benefit of this disclosure, will appreciate that other embodiments can be devised which do not depart from the scope of the invention as disclosed herein.

For example, one of ordinary skill in the art will understand embodiments in which the meaning of a value of 0 and 1 for a flag is reversed. For example, rather than having a value of 1 for a significant coefficient flag mean that the associated coefficient level is not zero, a value of 0 may be used and a value of 1 would mean that the associated coefficient level is 0.

In another example, one of ordinary skill in the art will understand embodiments in which index values, e.g., $c1$ above, begin at some value other than 0.

In another example, the number of contexts in context sets for CABAC encoding/decoding of a coefficient level flag may be further reduced, and thus the maximum value of the index $c1$ in the methods of FIGS. 11 and 13 may be reduced.

In another example, although some embodiments are described in reference to an example coefficient level flag that indicates that the absolute value of a coefficient level is greater than 1, one of ordinary skill in the art will understand embodiments in which one or more different coefficient level flags that signal the value relative to different thresholds are encoded using context sets with four (or fewer) contexts. For example, a coefficient level flag may be used to indicate that the absolute value of a coefficient level is greater than two. Such a context level flag may be used in conjunction with a coefficient level flag that indicates the absolute value is greater than one.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

The invention claimed is:

1. A method comprising:

initiating an encoding of a video sequence to produce an encoded video sequence, wherein the encoding of the video sequence includes:

encoding a first instance of a coefficient level flag for a sub-block;

initializing a context index variable to a value of one for the first instance of the coefficient level flag for the sub-block when no coefficient level flags have been encoded for the sub-block before the first instance of the coefficient level flag, wherein a maximum value for the context index variable is three;

selecting a respective context model for each instance of the coefficient level flag in the sub-block using the context index variable;

encoding a value of each coefficient level flag in the sub-block using the respective context model; and incrementing the context index variable after initializing the context index variable and in response to determining that the value of the coefficient level flag equals zero, wherein the context index variable is incremented no more than twice for the sub-block;

distributing the encoded video sequence over a communication channel; and causing a decoding of the encoded video sequence in a decoder device, wherein the causing comprises receiving the encoded video sequence by the decoder device.

2. The method of claim 1, further comprising displaying the decoded video sequence.

3. The method of claim 1, wherein the video sequence includes real-time video.

4. The method of claim 1, wherein the video sequence includes archived video.

5. The method of claim 1, wherein the video sequence includes a combination of video from a video content provider and computer-generated graphics.

6. The method of claim 1, wherein the video sequence includes a combination of real-time video and computer-generated graphics.

7. The method of claim 1, wherein distributing the encoded video sequence includes streaming the encoded video sequence over the communication channel.

8. The method of claim 1, wherein the communication channel includes a wide area network.

9. The method of claim 1, wherein the value of the coefficient level flag equaling zero indicates that a significant coefficient in the sub-block has an absolute value of one, and wherein the value of the coefficient level flag equaling one indicates that a significant coefficient in the sub-block has an absolute value greater than one.

10. A method comprising:

initiating an encoding of a video sequence to produce an encoded video sequence, wherein the encoding of the video sequence includes:

encoding a first instance of a coefficient level flag for a sub-block;

initializing a context index variable to a value of one for the first instance of the coefficient level flag for the sub-block when no coefficient level flags have been encoded for the sub-block before the first instance of the coefficient level flag, wherein a maximum value for the context index variable is three;

selecting a respective context model for each instance of the coefficient level flag in the sub-block using the context index variable;

encoding a value of each coefficient level flag in the sub-block using the respective context model; and incrementing the context index variable after initializing the context index variable and in response to determining that the value of the coefficient level flag equals zero, wherein the context index variable is incremented no more than twice for the sub-block;

distributing the encoded video sequence over a communication channel;

receiving the encoded video sequence by a decoder device; and causing the video sequence to be displayed.

11. The method of claim 10, wherein the video sequence includes archived video.

12. The method of claim 10, wherein the video sequence includes a combination of video from a video content provider and computer-generated graphics.

13. The method of claim 10, wherein the video sequence includes a combination of real-time video and computer-generated graphics.

14. The method of claim 10, wherein the communication channel includes a wide area network.

15. The method of claim 10, wherein the value of the coefficient level flag equaling zero indicates that a significant coefficient in the sub-block has an absolute value of one, and wherein the value of the coefficient level flag equaling one indicates that a significant coefficient in the sub-block has an absolute value greater than one.

16. A method comprising:

initiating an encoding of a video sequence to produce an encoded video sequence, wherein the encoding of the video sequence includes:

encoding a first instance of a coefficient level flag for a sub-block;

initializing a context index variable to a value of one for the first instance of the coefficient level flag for the sub-block when no coefficient level flags have been encoded for the sub-block before the first instance of the coefficient level flag, wherein a maximum value for the context index variable is three;

selecting a respective context model for each instance of the coefficient level flag in the sub-block using the context index variable;

encoding a value of each coefficient level flag in the sub-block using the respective context model; and incrementing the context index variable after initializing the context index variable and in response to determining that the value of the coefficient level flag equals zero, wherein the context index variable is incremented no more than twice for the sub-block;

causing a distribution of the encoded video sequence over a communication channel; and receiving the encoded video sequence by a decoder device.

17. The method of claim 16, wherein the video sequence includes a combination of video from a video content provider and computer-generated graphics.

18. The method of claim 16, wherein the video sequence includes a combination of real-time video and computer-generated graphics.

19. The method of claim 16, wherein the value of the coefficient level flag equaling zero indicates that a significant coefficient in the sub-block has an absolute value of one, and wherein the value of the coefficient level flag equaling one indicates that a significant coefficient in the sub-block has an absolute value greater than one.

20. The method of claim 16, wherein a size of the sub-block is 4×4 pixels.

* * * * *